United States Patent [19]
Arimilli et al.

[11] Patent Number: 5,893,163
[45] Date of Patent: Apr. 6, 1999

[54] METHOD AND SYSTEM FOR ALLOCATING DATA AMONG CACHE MEMORIES WITHIN A SYMMETRIC MULTIPROCESSOR DATA-PROCESSING SYSTEM

[75] Inventors: Ravi Kumar Arimilli, Austin; John Steven Dodson, Pflugerville; Jerry Don Lewis, Round Rock, all of Tex.

[73] Assignee: International Business Machines Corporation, Armonk, N.Y.

[21] Appl. No.: 992,135

[22] Filed: Dec. 17, 1997

[51] Int. Cl.[6] ................................................... G06F 12/08
[52] U.S. Cl. .................. 711/153; 711/120; 711/173; 711/141; 711/121; 711/119
[58] Field of Search ........................... 711/1, 117, 118, 711/119, 120, 121, 122, 141, 147, 150, 153, 170, 173, 206, 207, 208, 209, 216, 221, 3; 39/200.1, 830

[56] References Cited

U.S. PATENT DOCUMENTS

| | | | |
|---|---|---|---|
| 4,464,713 | 8/1984 | Benhase et al. | 711/205 |
| 4,646,237 | 2/1987 | Allen | 395/287 |
| 4,755,930 | 7/1988 | Wilson, Jr. et al. | 711/122 |
| 4,881,164 | 11/1989 | Hailpern et al. | 711/207 |
| 4,969,122 | 11/1990 | Jensen | 365/49 |
| 5,129,074 | 7/1992 | Kikuchi et al. | 711/173 |
| 5,247,648 | 9/1993 | Watkins et al. | 711/143 |
| 5,303,362 | 4/1994 | Butts, Jr. et al. | 711/121 |
| 5,353,430 | 10/1994 | Lautzenheiser | 711/117 |
| 5,604,882 | 2/1997 | Hoover et al. | 711/121 |
| 5,659,699 | 8/1997 | Breternitz, Jr. | 711/216 |
| 5,659,714 | 8/1997 | Yoshida | 711/211 |
| 5,664,152 | 9/1997 | Ezzet | 711/153 |
| 5,680,571 | 10/1997 | Bauman | 711/122 |
| 5,684,993 | 11/1997 | Willman | 395/677 |
| 5,694,567 | 12/1997 | Bourekas et al. | 711/3 |

Primary Examiner—Tod R. Swann
Assistant Examiner—B. James Peikari
Attorney, Agent, or Firm—Volel Emile; Antony P. Ng; Andrew J. Dillon

[57] ABSTRACT

A method and system for allocating data among cache memories within a symmetric multiprocessor data-processing system are disclosed. The symmetric multiprocessor data-processing system includes a system memory and multiple processing units, wherein each of the processing units has a cache memory. The system memory is divided into a number of segments, wherein the number of segments is equal to the total number of cache memories. Each of these segments is represented by one of the cache memories such that a cache memory is responsible to cache data from its associated segment within the system memory.

11 Claims, 6 Drawing Sheets

METHOD AND SYSTEM FOR ALLOCATING DATA AMONG CACHE MEMORIES WITHIN A SYMMETRIC MULTIPROCESSOR DATA-PROCESSING SYSTEM

RELATED PATENT APPLICATION

This patent application is related to a copending application U.S. Ser. No. 08/992,134 filed on even date, entitled "SYSTEM AND METHOD FOR ENHANCING CACHE MEMORY UTILIZATION WITHIN A SYMMETRIC MULTIPROCESSOR DATA-PROCESSING SYSTEM" (IBM Docket No. AT9-97-425).

BACKGROUND OF THE INVENTION

1. Technical Field

The present invention relates to a method and system for sharing data among cache memories in general and, in particular, to a method and system for sharing data among cache memories within a symmetric multiprocessor data-processing system. Still more particularly, the present invention relates to a method and system for allocating data among cache memories within a symmetric multiprocessor data-processing system.

2. Description of the Prior Art

In a symmetric multiprocessor (SMP) data-processing system, all of the processing units are generally identical; that is, they all have the same architecture and utilize a common set or subset of instructions and protocols to operate. Typically, each processing unit includes a processor core having at least one execution unit for carrying out program instructions. In addition, each processing unit may include at least one level of caches, commonly referred to as L1 or primary caches, which are implemented with high-speed memories. In most cases, a second level of caches, commonly referred to as L2 or secondary caches, may also be included in each processing unit for supporting the first level caches. Each level of cache stores a subset of the data and instructions contained in a system memory for low latency access by the processor cores.

Within an SMP environment, if a first processing unit contains a modified copy of data that is being requested by a second processing unit, the first processing unit does not send the requested data to a system memory for access by the second processing unit; instead, a cache-to-cache transfer of the requested data from the first processing unit to the second processing unit is performed. Upon receipt of the cache-to-cache transfer of the requested data, the second processing unit returns an acknowledgement of the receipt to the first processing unit. The process of transferring data from one processing unit to another processing unit on a system bus without going through a system memory is referred to as "intervention." An intervention protocol improves system performance by reducing the number of cases in which the high latency system memory must be accessed in order to satisfy a read or read-with-intent-to-modify request by any one of the processing units within the SMP data-processing system.

Because the latency associated with system memory access are generally quite large, it is apparent that it would be advantageous to maintain as much useful data in at least one of the cache memories as possible to allow for intervention such that system memory access may be avoided. To that end, the present invention provides an improved method and system for allocating data among cache memories within a SMP data-processing system such that as much useful data are maintained in at least one of the cache memories as possible in order to minimize the frequency of system memory accesses.

SUMMARY OF THE INVENTION

In view of the foregoing, it is therefore an object of the present invention to provide an improved method and system for sharing data among cache memories.

It is another object of the present invention to provide an improved method and system for sharing data among cache memories within a symmetric multiprocessor data-processing system.

It is yet another object of the present invention to provide an improved method and system for allocating data among cache memories within a symmetric multiprocessor data-processing system.

In accordance with a method and system of the present invention, a data-processing system includes a system memory and multiple processing units, wherein each of the processing units has a cache memory. The system memory is divided into a number of segments, wherein the number of segments is equal to the total number of cache memories. Each of these segments is represented by one of the cache memories such that a cache memory is responsible to cache data within its associated segments within the system memory.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be applicable to any symmetric multiprocessor (SMP) data-processing system in which each processing unit has at least one associated local cache memory.

Figure 1:
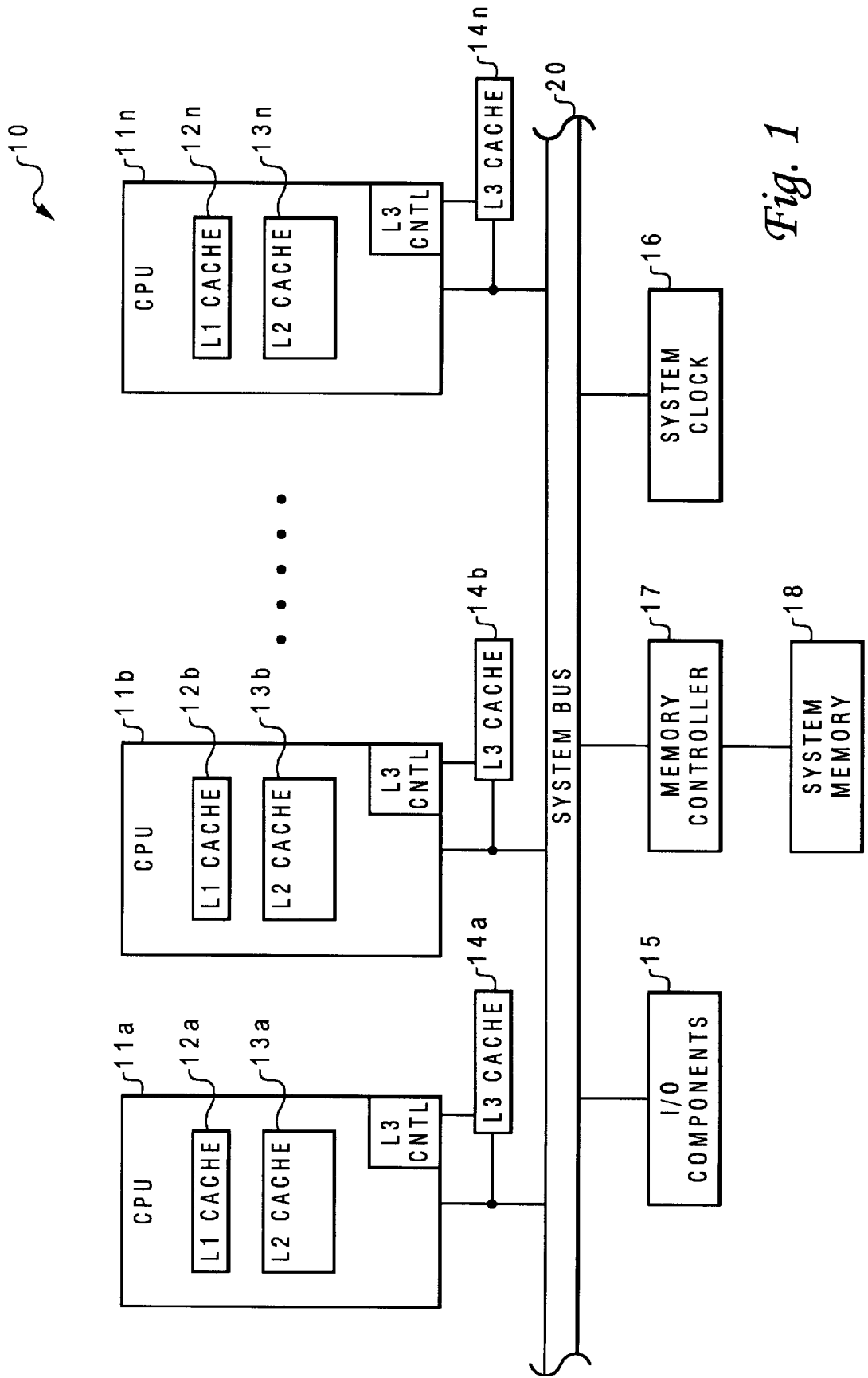
FIG. 1 is a block diagram of a SMP data-processing system in which the present invention may be implemented.

Referring now to the drawings and, in particular, to FIG. 1, there is depicted a block diagram of a SMP data-processing system 10 in which the present invention may be implemented. SMP data-processing system 10 includes multiple central processor units (CPUs) 11a–11n, and each of CPUs 11a–11n contains as least one level of local cache. As shown, CPU 11a contains a primary cache 12a and a secondary cache 13a, CPU 11b contains a primary cache 12b and a secondary cache 13b, while CPU 11n contains a primary cache 12n and a secondary cache 13n. In addition, each of CPUs 11a–11n also includes an L3 cache controller for controlling a corresponding one of tertiary caches 14a–14n.

All CPUs 11a–11n are coupled to an interconnect such as a system bus 20. For enhanced scalability, the interconnect may also be implemented by utilizing a cross-bar switch. A system clock 16 is coupled to system bus 20 for supplying clock signals to all the components within SMP data-processing system 10, including I/O components 15. Memory controller 17 is coupled to a system memory 18, which contains various instructions and data for the normal operations of SMP data-processing system 10.

For the purpose of illustration, a CPU, a primary cache, a secondary cache, and a tertiary cache (such as CPU 11a, primary cache 12a, secondary cache 13a, and tertiary cache 14a, as depicted in FIG. 1) may be collectively known as a processing unit. Although a preferred embodiment of an SMP data-processing system is described in FIG. 1, it should be understood that the present invention can be practiced within a variety of SMP data-processing system configurations.

A preferred size allocation for each level of the memory hierarchy within SMP data-processing system 10 is as follows. Each primary cache is 64 KBytes total in size, with 32 KBytes for instruction-caching and 32 KBytes for data-caching. Each secondary cache is 512 KBytes and each tertiary cache is 4 MBytes. The system memory is approximately 4 GBytes. The latency associated with accessing each level of the memory hierarchy is typically one processor-clock cycle, five processor-clock cycles, 17 processor-clock cycles, and 65 processor-clock cycles for the primary cache, the secondary cache, the tertiary cache, and the system memory, respectively.

Based on these access times, it would be advantageous to reduce the frequency of system memory accesses as much as possible in order to maintain a high system performance. This can be accomplished by maintaining as much useful data (and/or instructions) in at least one of cache memories 12–14 as possible, in other words, by maintaining a relatively high "cache hit" ratio.

In the prior art, each of the cache memories typically contains data that are only pertinent to its associated local processing unit. For example, L3 cache 14a generally contains data that is germane to the program execution of CPU 11a, L3 cache 14b generally contains data that is germane to the program execution of CPU 11b, and L3 cache 14n generally contains data that is germane to the program execution of CPU 11n. In these cases, each processing unit accesses data or instruction from distinctively different address ranges within the system memory, and there is seldom a situation when certain data requested by a processing unit is stored within a local cache of another processing unit. As a result, system memory accesses typically increase when the requested data is not in the local caches, which will lead to a substantial performance penalty to the entire SMP data-processing system when the frequency of system memory access becomes too high.

However, when all processing units are concurrently accessing a relatively small common area of the system memory, it is quite common to have the same data stored within the local caches of each processing unit. For example, all L3 caches 14a–14n may contain much of the same data if CPU 11a–11n are executing an identical program in parallel. In this kind of setup, when certain data or instructions requested by a processing unit are not in its local caches, it is likely that the requested data or instructions will also not be present in a local cache of any other processing unit within the SMP data-processing system. As a result, the frequency of access to the system memory is again increased.

Nevertheless, there are also other situations when the requested data is stored within a local cache of another processing unit within the SMP data-processing system. In those situations, e.g., when some data requested by CPU 11a happens to be present within L3 cache 14b, an intervention protocol may be invoked in order to source the requested data from L3 cache 14b to CPU 11a via a cache-to-cache transfer such that system memory access can be avoided. But this kind of situation is less likely to occur when each individual processing unit is accessing data from distinctively different address ranges within the system memory.

Broadly speaking, there is a natural dichotomy in the number of ways a software program may be executed within a SMP data-processing system. For example, when a program is very large, the execution of the program may be distributed among all the processing units within the SMP data-processing system such that the processing units are accessing common areas of system memory space. In such a case, the data within each local cache are most likely to be shared or required by other processing units within the SMP data-processing system. On the other hand, when each processing unit is executing a different program, it is most likely that the data in the local caches are only required by the associated local processing unit such that there is probably little data sharing between processing units within the SMP data-processing system.

In the case in which data-sharing is normally demanded, it is beneficial to have all the cache memories to cover as much address spaces within the system memory as possible and to avoid duplicate data storage in more than one cache memory. On the other hand, in the case in which data-sharing is normally not demanded, it is beneficial to have the data pertaining to the local processing unit to remain within the cache memories associated with the local processing unit as much as possible, instead of storing in a cache memory associated with another processing unit. Thus, each cache memory within an SMP data-processing system is provided with a mode select utilized to choose between a private mode or a shared mode.

For the sake of simplicity, only L3 caches are utilized as an example for illustration. In a private mode, each L3 cache may individually store data from any address space within the system memory. Thus, at any point in time, one or more cache memories may contain shared copies of the same data. From a processing unit stand point, each processing unit retains most if not all of its local L3 cache. In other words, if there are four L3 caches within the entire SMP data-processing system and each of the four L3 caches is 4 MBytes in size, then under the private mode, each processing unit will have a 4 MBytes L3 cache capable of caching data from any address space within the system memory.

In a shared mode, all L3 caches within the SMP data-processing system are combined, each L3 cache representing different segments of the system memory. For example, if there are a total of four L3 caches within the SMP data-processing system, then these four L3 caches are combined to represent four different segments that made up the entire address spaces of the system memory. These four segments may or may not be contiguous but they must be representing different address spaces of the system memory. From the stand point of each processing unit within the SMP data-processing system, all four L3 caches become one "giant" L3 cache. In other words, if each of the L3 caches is 4 MBytes in size, then under the shared mode, each processing unit will essentially have a 16 MBytes L3 cache representing all the address spaces within the system memory. Data in a non-local L3 cache will be transferred to a requesting processing unit by intervention protocol via the interconnect. In essence, under the shared mode, the more L3 caches added to the SMP data-processing system, the more total L3 cache spaces all processing units effectively have such that the "cache hit" ratio should be higher than when each L3 cache operates independently.

Figure 2:
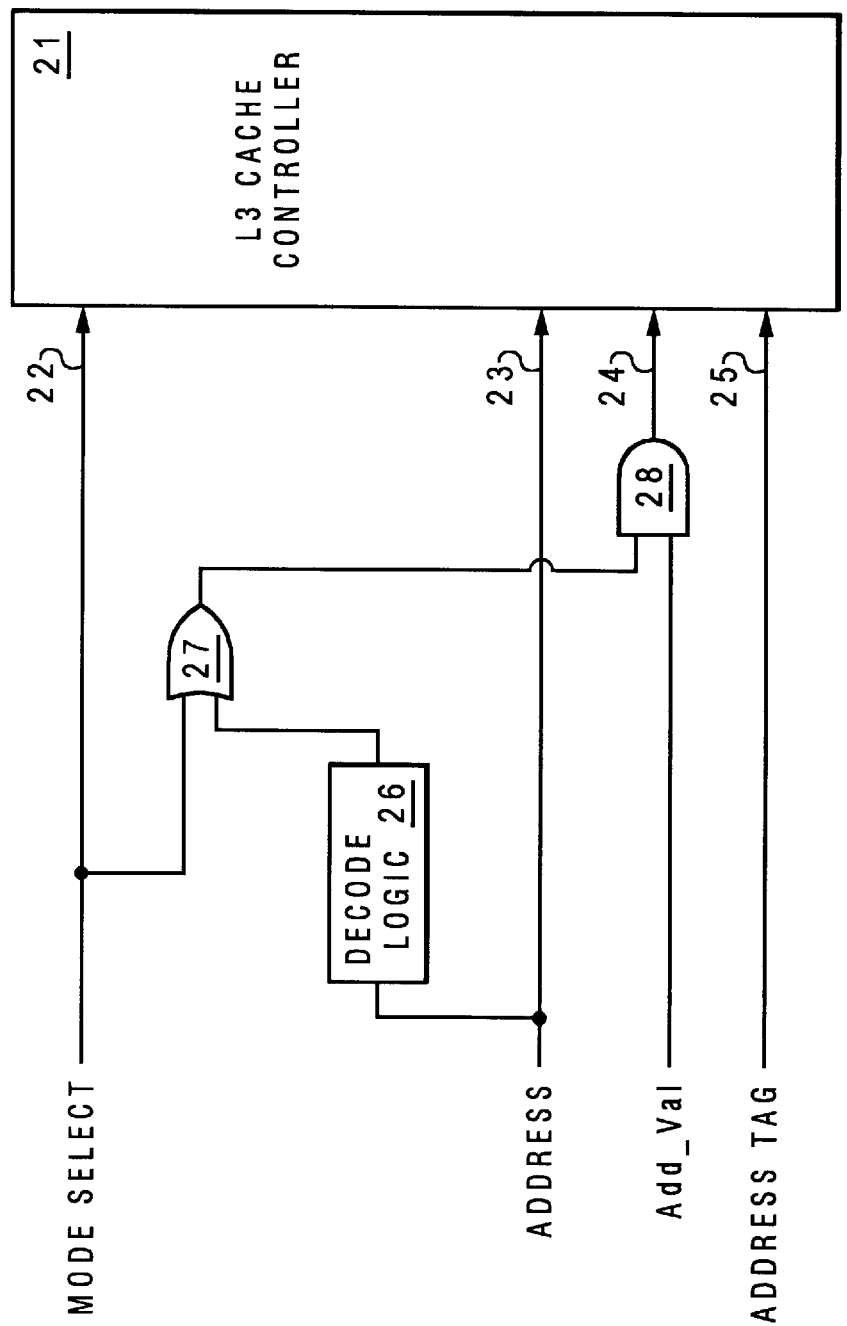
FIG. 2 is a block diagram illustrating an apparatus for providing a mode select for enhancing cache is memory utilization within a SMP data-processing system.

With reference now to FIG. 2, there is depicted a block diagram illustrating an apparatus for providing a mode select for enhancing cache memory utilization within a SMP data-processing system. As shown, L3 cache controller 21 has four signal inputs—mode select input 22, address bus input 23, Add_Val input 24, and tag input 25.

Mode select input 22 selects one of the two preferred modes of operation for an associated L3 cache. This mode selection allows the associated L3 cache to be operated under a shared mode or a private mode, as detailed supra. The mode selection signal may be controlled by either software or hardware as it is deemed appropriate for a specific application. Address bus input 23 receives real addresses from system bus 20. Add_Val input 24 indicates when an address is valid. An assertion of Add_Val 24 allows an incoming address received at address bus input 23 to be read by L3 cache controller 21. Tag input 25 is for the input of a tag that is associated with the address at address bus input 23 and identifies the source of the address.

As shown, the mode select signal is combined with a decode logic signal from a decode logic 26 via an OR gate 27 to provide a qualifying signal. This qualifying signal is then combined with an address valid signal via an AND gate 28 to provide a true address valid signal to be input to Add_Val input 24. A selection of a private mode is preferably indicated by a logical "1" as the mode select signal and a selection of a shared mode is preferably indicated by a logical "0" as the mode select signal. When the mode select signal is a logical "1," the decode logic signal from decode logic 26 is essentially a don't care such that the address valid signal is never gated and L3 cache controller will be presented with any valid address at address bus input 23. On the contrary, when the mode select signal is a logical "0," decode logic signal from decode logic 26 dictates whether or not an address occurred at address bus input 23 should be made visible to L3 cache controller 21.

Figure 3:
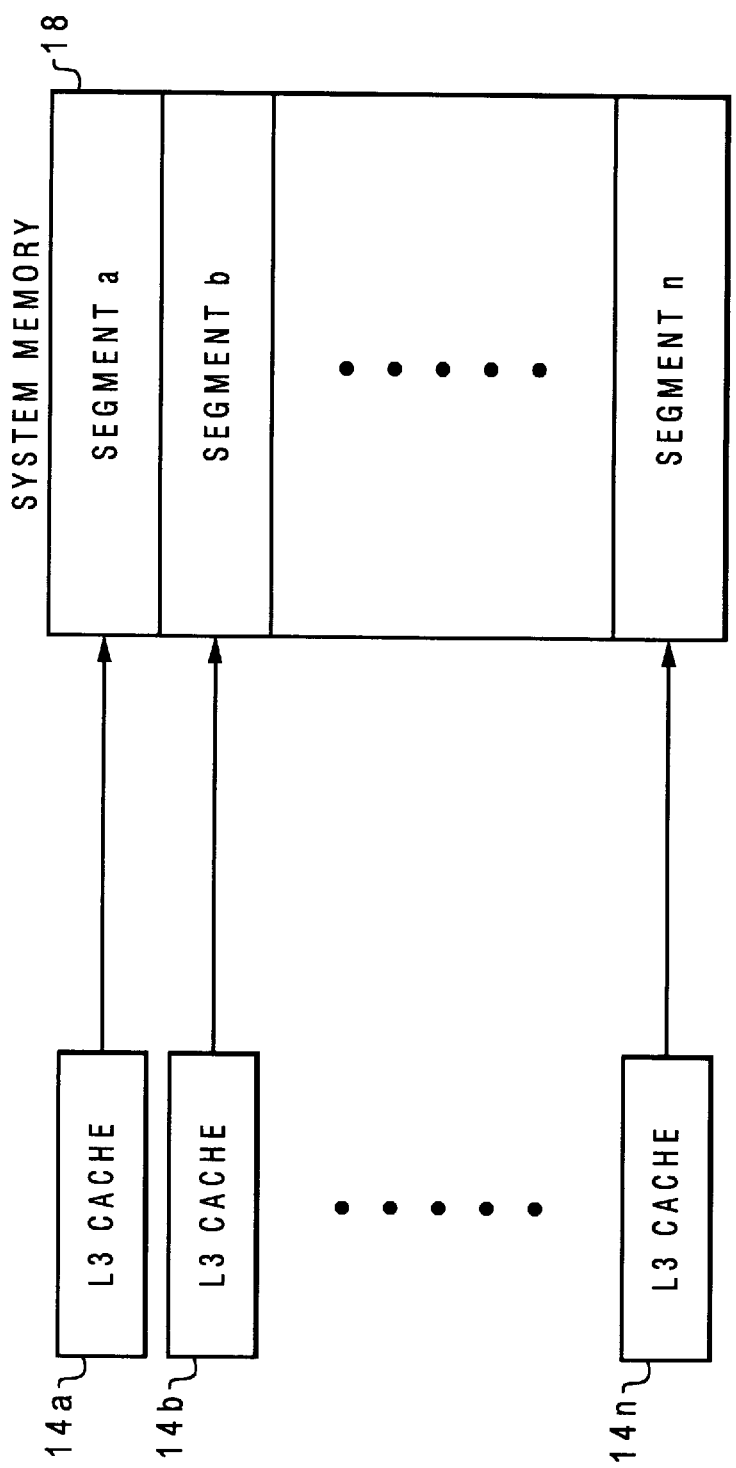
FIG. 3 is a block diagram illustrating the relationship between cache memories and a system memory in a shared mode, in accordance with a preferred embodiment of the present invention.

Under the shared mode, the system memory is divided into a number of contiguous segments. The number of contiguous segments is preferably equal to the total number of L3 caches within the SMP data-processing system. Each of segments is associated with one of the L3 caches such that each L3 cache represents a contiguous segment of the system memory, as illustrated in FIG. 3. Accordingly, each L3 cache will be responsible for caching an associated segment of the system memory. As such, all the address spaces of the entire system memory are represented by this "combined" L3 cache. Decode logic 26 will determine whether or not an incoming address is within the address space of the system memory its associated L3 cache represents. Only when the address is within the valid address space will L3 cache controller 21 be accessed. For example, if there are four L3 caches within the SMP data-processing system, only one of the four L3 caches will be utilized to cache data from a segment of the system memory at any given time.

Figure 4:
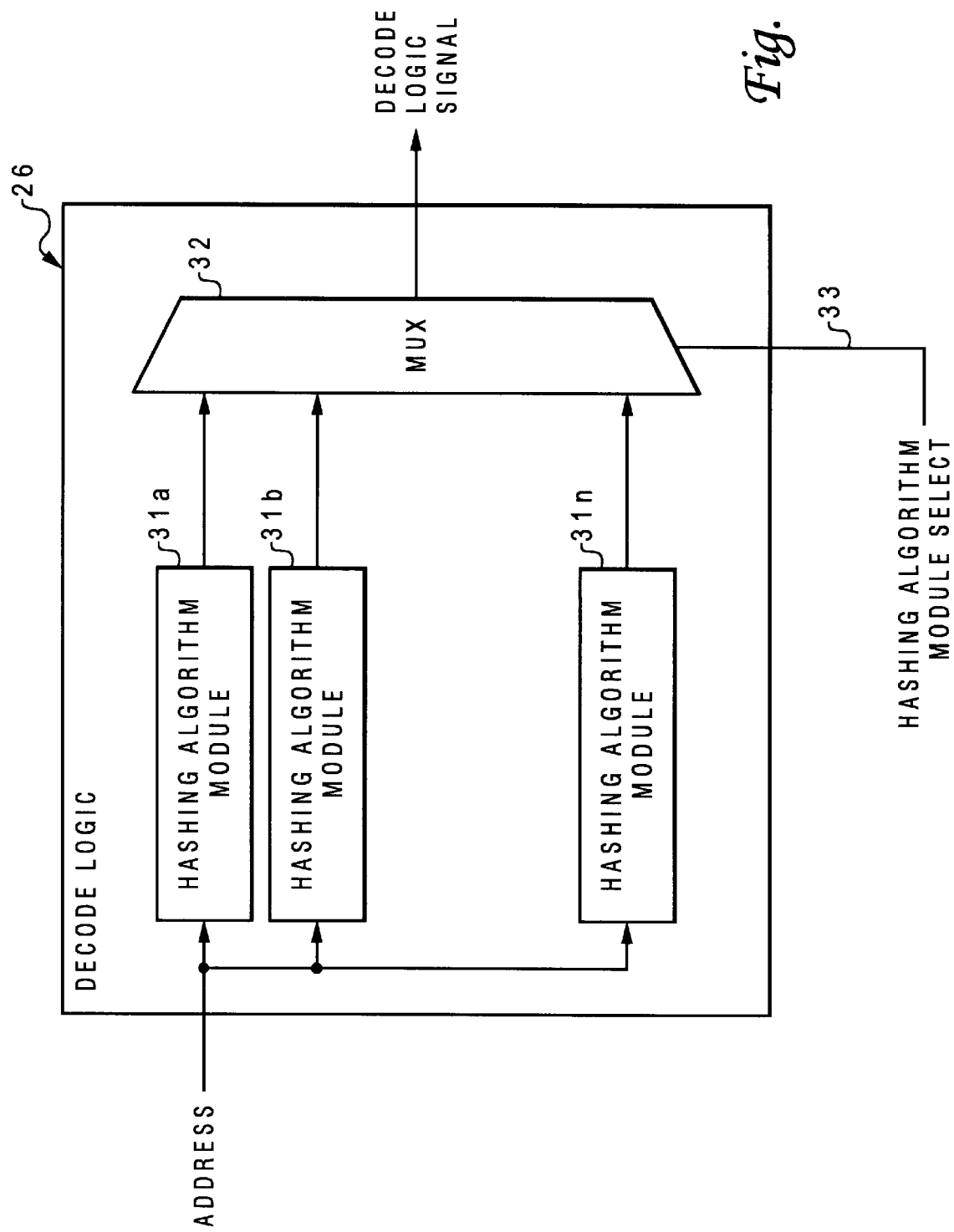
FIG. 4 is a detailed block diagram of a decode logic from FIG. 3, in accordance with a preferred embodiment of the present invention.

Referring now to FIG. 4, there is illustrated a detailed block diagram of decode logic 26 from FIG. 3, in accordance with a preferred embodiment of the present invention. As shown, decode logic 26 includes hashing algorithm modules 31a–31n and a multiplexer 32. Each of hashing algorithm modules 31a–31n includes a different hashing algorithm that can be selected via a hashing algorithm module select 33. The selection of a particular one of hashing algorithm modules 31a–31n preferably depends on the type of software program that is currently executing within the SMP data-processing system. Such selection should be based on the compatibility of the hashing algorithm with the software program such that an optimal result can be produced. Hashing algorithm selection can be made by either hardware or software, as is well-known in the relevant art.

Figure 5:
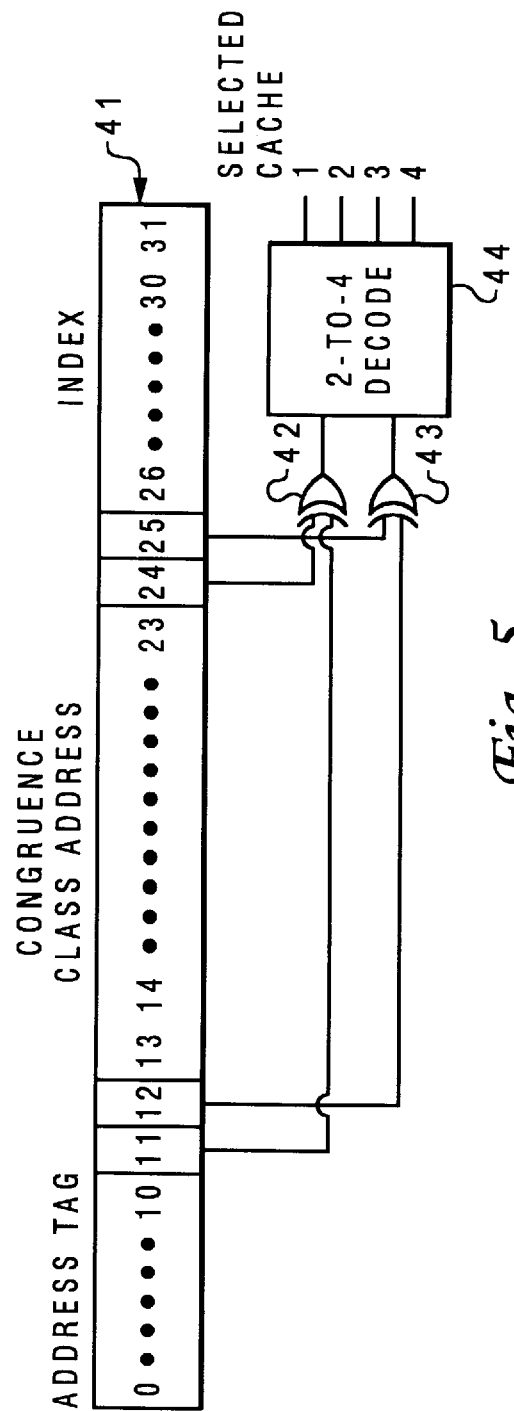
FIG. 5 illustrates an example of a hashing method for associating various segments within a system memory to a "combined" L3 cache, in accordance with a preferred embodiment of the present invention.

With reference now FIG. 5, there is depicted an example of a hashing method for associating various segments within a system memory to a "combined" L3 cache, in accordance with a preferred embodiment of the present invention. Each L3 cache is, for example, an eight-way set-associative cache having 64 byte-lines, and 32 bit-address, which made up to a total size of 4 MBytes. As shown, address 41 is a 32-bit address for indexing to the system memory, wherein bits 0–12 are address tag, bits 13–25 are congruence class address, and bits 26–31 are cache line index. Bits 11, 12, 24, and 25 are utilized for the hashing scheme in accordance with a preferred embodiment of the present invention.

As shown, bit 11 is XORed with bit 24 via an XOR gate 42, and bit 12 is XORed with bit 25 via an XOR gate 43. The output of XOR gate 42 and XOR gate 43 are then combined within a two-to-four decoder 44 to produce an output which indicates a cache to be selected.

Figure 6:
FIG. 6 depicts an exemplary truth table of the hashing logic by utilizing the bits shown in FIG. 5.

Referring now to FIG. 6, there is illustrated an exemplary truth table of the hashing logic by utilizing bits 11, 12, 24, and 25, as described above. Column 51 provides all the bit combinations and column 52 provides the associated L3 cache. Roughly speaking, every other fourth row of address bits in column 51 should represent the same segment of the system memory. Hence, each large segment of the system memory is dispersed among the L3 caches. This is only an example of a hashing scheme that can be utilized for a 32-bit address, and it is well understood by those skilled in the art that various forms of hashing scheme may be utilized to allocate data among the cache memories in accordance with the principle of the present invention.

As has been described, the present invention provides a method for allocating data among cache memories within a symmetric multiprocessor data-processing system. All the cache memories within the SMP data-processing system can be operated under either a private mode or a shared mode in order to take advantage of the way a software program is being executed within the SMP data-processing system. The present invention also provides a hashing method for allocating data among these cache memories under the shared mode. Furthermore, a multiple of hashing algorithm can be provided and each hashing algorithm can be programmable selected based on the type of software program currently executing within the SMP data-processing system.

While the invention has been particularly shown and described with reference to a preferred embodiment, it will be understood by those skilled in the art that various changes in form and detail may be made therein without departing from the spirit and scope of the invention.

What is claimed is:

1. A method for allocating data among cache memories within a symmetric multiprocessor data-processing system, wherein said symmetric multiprocessor data-processing system includes a system memory and a plurality of processing units, each of said plurality of processing units includes a cache memory for storing a subset of data contained within said system memory, said method comprising the steps of:

dividing said system memory into a number of segments;

associating each of said segments of said system memory with a respective one of said cache memories; and utilizing one of said cache memories to cache data from an associated one of said segments of said system memory.

2. The method for allocating data among cache memories within a symmetric multiprocessor data-processing system according to claim 1, wherein said associating step further includes a step of associating each of said segments of said system memory with a respective one of said cache memories by hashing.

3. The method for allocating data among cache memories within a symmetric multiprocessor data-processing system according to claim 1, wherein each of said segments of said system memory is a contiguous address space within said system memory.

4. The method for allocating data among cache memories within a symmetric multiprocessor data-processing system according to claim 1, wherein said method further includes a step of determining whether or not an incoming address is within one of said segments of said system memory.

5. A symmetric multiprocessor data-processing system comprising:

a system memory;

a plurality of processing units coupled to said system memory via an interconnect, wherein each of said processing units includes a cache memory for storing a subset of data contained within said system memory;

means for dividing said system memory into a number of segments;

means for associating each of said segments of said system memory with a respective one of said cache memories; and means for utilizing one of said cache memories to cache data from an associated one of said segments of said system memory.

6. The symmetric multiprocessor data-processing system according to claim 5, wherein said associating means further includes a plurality of hashing algorithm modules for associating each of said segments of said system memory with a respective one of said cache memories.

7. The symmetric multiprocessor data-processing system according to claim 6, wherein one of said plurality of hashing algorithm modules can be selected via software or hardware.

8. The symmetric multiprocessor data-processing system according to claim 5, wherein each of said segments of said system memory is a contiguous address space within said system memory.

9. The symmetric multiprocessor data-processing system according to claim 5, wherein said system further includes a decode logic for determining whether or not an incoming address is one of said segments of said system memory.

10. The method for allocating data among cache memories within a symmetric multiprocessor data-processing system according to claim 1, wherein said number of segments is equal to a total number of said cache memories at a particular level in a cache hierarchy within said symmetric multiprocessor data-processing system.

11. The symmetric multiprocessor data-processing system according to claim 5, wherein said number of segments is equal to a total number of said cache memories at a particular level in a cache hierarchy within said symmetric multiprocessor data-processing system.

* * * * *